United States Patent [19]

Tran

[11] 4,350,005
[45] Sep. 21, 1982

[54] FRUIT PICKER

[76] Inventor: Thanh G. Tran, 5631 21st Ave. SW., Seattle, Wash. 98106

[21] Appl. No.: 285,266

[22] Filed: Jul. 20, 1981

[51] Int. Cl.³ ............................................. A01D 46/24
[52] U.S. Cl. ..................................................... 56/340
[58] Field of Search ................. 56/331, 332, 333, 339, 56/340

[56] References Cited

U.S. PATENT DOCUMENTS

| | | | |
|---|---|---|---|
| 194,323 | 8/1877 | Berbeyer | 56/339 |
| 258,846 | 5/1882 | Allen | 56/340 |
| 282,051 | 7/1883 | Castor | 56/339 |
| 406,744 | 7/1889 | Kriner | 56/339 |
| 459,660 | 9/1891 | Smith | 56/339 |
| 1,264,835 | 4/1918 | Matsuzaka | 56/339 |
| 1,729,762 | 10/1929 | Clark | 56/339 |
| 2,167,133 | 7/1939 | Wetzig | 56/339 |
| 2,334,292 | 11/1943 | Schaefer | 56/339 |
| 2,772,534 | 12/1956 | Tarello | 56/335 |
| 3,323,297 | 6/1967 | Conradt | 56/339 |
| 3,389,543 | 6/1968 | Clark | 56/337 |

Primary Examiner—Robert A. Hafer
Attorney, Agent, or Firm—Graybeal & Uhlir

[57] ABSTRACT

An apparatus (10) for picking fruit from a tree when standing on the ground includes a generally cylindrically shaped, upwardly open receptacle (12) attached to the upper end of an elongate pole (14). A plurality of spaced apart fingers (34) project upwardly from the upper edge portion of receptacle (12). Each finger (34) includes an enlarged base portion (38) composed of downwardly sloping shoulders (40) which extend laterally outwardly from the side edges (41) of fingers (34) to intersect with corresponding shoulders (40) of next adjacent fingers (34). The edge portions of shoulders (40) are sharpened to form cutting edges (44) which cleanly cut the stem of fruit when edges (44) are pushed upwardly against the stem thereby allowing the fruit to drop into receptacle (12).

4 Claims, 8 Drawing Figures

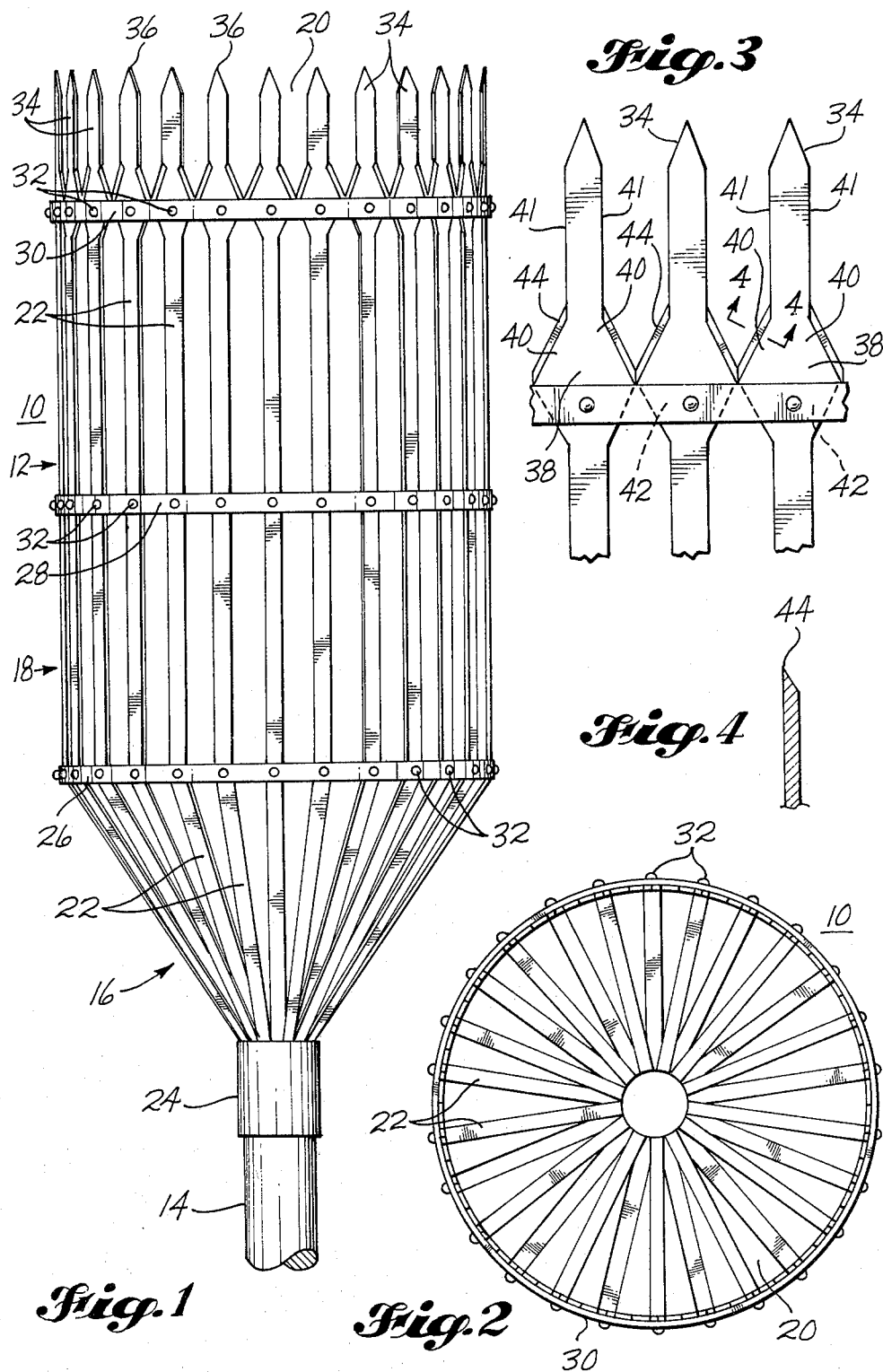

FRUIT PICKER

DESCRIPTION

1. Technical Field

The present invention relates to an agricultural apparatus, and particularly to a device for picking fruit from high limbs while standing on the ground.

2. Background Art

One type of known fruit picket of the general nature of the present invention is constructed from an upwardly open basket or receptacle fixed to the upper end of a long pole. A series of closely spaced teeth or prongs project upwardly from the upper edge portion of the basket. In use, the picker is manipulated so that the stem of a fruit is positioned between two adjacent prongs and then the picker is twisted to break the stem so that the fruit falls downwardly into the basket. Examples of this type of fruit picker are disclosed by U.S. Pat. Nos. 194,323; 1,264,835; 1,729,762; and 2,167,133. In the '762 patent the teeth are tapered in the upwardly direction to define downwardly tapered slots between them to assist in positioning the fruit stem between two adjacent teeth. The tips of the teeth are covered with tar or plastic material so that they do not cut the fruit. In the '133 patent, the teeth are formed in the shape of hooks defining a downwardly open bight. The hooks are not sharpened, but are smooth all over to avoid scratching the fruit. One drawback of this type of fruit picker is that the fruit is separated from the tree by using the teeth of the picker to twist the stems which causes jagged uneven breaks in the stem. Also, since the teeth are typically formed all the way around the perimeter portion of the basket, which is typically cylindrical in shape, additional branches may be lodged between other teeth so that when the picker is twisted several branches may be broken at the same time which can cause damage to the fruit tree.

In a similar type of fruit picker, long wire prongs extend upwardly from the upper rim of a receptacle which is attached to the end of an elongate pole. The prongs are bent at their upper end portions to extend horizontally. In use, the picker is positioned so that the stem of the fruit is located between two adjacent prongs and then the picker is pulled to snap the fruit away from the stem. A drawback of this particular type of fruit picker is that when the fruit separates from the stem under the tension placed on the stem by the prongs, it is propelled into the receptacle at a high rate of speed, possibly damaging the fruit. Also, after the stem and branches separate from the fruit, the branches may continue to vibrate or bounce thus causing nearby fruit to fall from the tree onto the ground. An example of this particular type of fruit is disclosed in U.S. Pat. No. 3,323,297.

U.S. Pat. No. 2,334,292 discloses a type of fruit picker constructed similarly to the above described '297 patent, with the exception that the wire fingers project horizontally from a side opening formed in a vertically disposed bag.

In a further type of fruit picker, as disclosed in U.S. Pat. No. 2,277,534, a plurality of finger pairs are pivotally mounted on and extend upwardly from a circular ring member spaced a short distance above the upper rim of an upwardly open receptacle. The upper ends of each pair of fingers are joined together at a sharp cutting edge. A band, which encircles the upper portions of the finger pairs, is connected to a bell crank which is pivotally mounted on the ring member which also supports the receptacle. In use, the picker is positioned so that fruit is placed between adjacent finger pairs and then a cable which is connected to the bell crank is pulled thereby causing the bell crank to pivot and the fingers to close together so that they grippingly engage the fruit stem and so that the sharp upper edges of the fingers sever the stem. The '534 patent also discloses an alternative type of fruit picker in which the wire band, which surrounds the upper portions of the fingers, is replaced by a flexible, flat metal band having a sharpened upper cutting edge designed to cut the stems of the fruit as the fingers are closed together. One drawback of this particular type of fruit picker is that it has many moving parts thereby substantially complicating its design relative to fruit pickers with no moving parts.

Further types of fruit pickers are disclosed by U.S. Pat. Nos. 258,846 and 459,660, both of which utilize moving blades to cut the stem of the fruit. In the '846 patent, the receptacle is constructed from coaxially arranged cylinders having diagonal teeth extending upwardly in opposite directions from the upper edge portions of the cylinders. The teeth of the outer cylinder are nominally disposed above the teeth of the inner cylinder. In use, the stem of the fruit is threaded between the teeth of the outer cylinder and then the outer cylinder is pulled downwardly so that the teeth of the inner and outer cylinder close together to sever the stem of the fruit. In the '660 patent, a single blade is pivotally mounted between a pair of vertically spaced plates which overlie a portion of the top opening of a receptacle. The blade severs the stem of the fruit after the fruit has been placed within a notch formed in the plates.

It is principal object of the present invention to overcome the drawbacks of the fruit pickers disclosed in the above discussed patents by providing a fruit picker of uncomplicated design with no moving parts which is adapted to cleanly sever the stem of the fruit without damaging adjacent branches or fruit.

DISCLOSURE OF THE INVENTION

The present invention relates to a fruit picking apparatus to enable a user while standing on the ground to reach fruit located high in a tree. In one typical embodiment of the invention, an upwardly open receptable is attached to the end of an elongate handle. The receptacle is constructed from a series of spaced apart, flat staves arranged relative to each other to define a generally cylindrical shape. A series of vertically spaced flat bands encircle the staves and are fixedly attached to each of the staves to form a generally rigid cylindrical construction. The upper end portions of the staves extend above the uppermost band to define a series of spaced apart fingers which terminate at a tapered point. At the base portion of each of the fingers, i.e. at the elevation of the uppermost band, the side edges of the fingers slope downwardly and laterally outwardly toward the adjacently located fingers. The sloped adjacent shoulders of adjacently positioned fingers intersect each other at about the upper edge of the upper band. The edge portion of each of the shoulders is sharpened to define sharp blades. In use, the picking device is manipulated so that the stem of a fruit is received between a pair of fingers and then lodged between adjacently located blades with the fruit disposed within the receptable opening. Thereafter, the picker is pushed upwardly so that the sharpened blades cleanly cut the stem of the fruit allowing the fruit to drop within the receptacle. After the receptacle is filled, it is simply lowered to the ground and emptied.

In another aspect of the present invention, the receptacle is composed of a generally cylindrically shaped body portion and a closed, dome-shaped top and bottom. The receptacle may be constructed from lengths of wire which run the entire length of the receptacle with the exception of the wires aligned with a vertical opening formed in the body portion of the receptacle. The vertical wires which intersect the receptacle opening project upwardly and downwardly into the opening to thereby define a series of closely spaced apart fingers. A curved blade corresponding to the curvature of the receptacle body portion is fixed to the upper and lower margins of the receptcle opening. The upper edge of the lower blade and the lower edge of the upper blade are sharpened to define sharp cutting edges. A downwardly opened hook member extends upwardly from the upper end of the receptacle. In use, the fruit picker is positioned so that the stem of a fruit extends between an adjacent pair of fingers with the fruit disposed within the receptacle opening, and then the receptacle is either pushed upwardly or pulled downwardly to allow one of the blades to cleanly cut the stem whereupon the fruit simply drops within the interior of the receptacle. Once filled, the receptacle can be conveniently lowered to the ground and emptied.

In a further aspect of the present invention, an attachment is secured to the upper edge portion of an upwardly open, generally cylindrically shaped receptacle which is secured to the upper end of an elongate pole. The attachment includes a rim member which encircles the upper margin of the receptacle and a plurality of closely spaced apart fingers which extend upwardly from the rim member in spaced relationship to each other to terminate at a pointed tip. The upper edge of the rim which extends between adjacent fingers is sharpened to form a cutting edge. In use, the picking device is manipulated so that the stem of a fruit is placed between a pair of adjacent fingers with the fruit disposed within the opening of the receptacle. Then the picker is pushed upwardly so that the sharpened blade extending between the two fingers cleanly severs the stem thereby allowing the fruit to drop into the receptacle.

It will be appreciated that the fruit pickers constructed according to the various embodiments of the present invention enable a user to conveniently and efficiently pick fruit while standing on the ground. The fruit is severed from its stem by using the sharpened blades of the picker to cleanly cut the stem by either pushing the picker upwardly or pulling it downwardly against the stem. As a consequence, neither the adjacently located tree limbs or fruit are damaged during use of the present invention. Also, the fruit picker is of an uncomplicated and durable design not involving any moving parts.

BRIEF DESCRIPTION OF THE DRAWINGS

The details of typical embodiments of the present invention will be described in connection with the accompanying drawings, in which:

FIG. 1 is a fragmentary, side elevational view of a typical embodiment of a fruit picker constructed according to the present invention.

FIG. 2 is a plan view of the fruit picker illustrated in FIG. 1;

FIG. 3 is an enlarged, fragmentary elevational view of the upper portion of the fruit picker of the present invention illustrated in FIGS. 1 and 2;

FIG. 4 is a greatly enlarged, cross-sectional view of a portion of the present invention illustrated in FIG. 3, taken substantially along lines 4—4 thereof;

BEST MODE OF THE INVENTION

Figure 8:
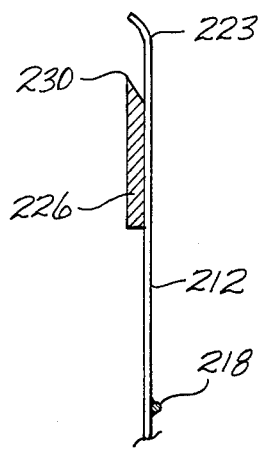
FIG. 8 is an enlarged, partial cross-sectional view of the embodiment of the present invention illustrated in FIG. 7; taken substantially along lines 8—8 thereof.

Referring initially to FIG. 1, a fruit picker 10 constructed according to the best mode of the invention currently known to applicant is illustrated as including a receptacle or container 12 attached to the upper end of an elongate pole or handle 14 which is held by the user standing on the ground. Pole 14 may be formed from one elongate member or may be composed of segments which detachably connect together or telescope relative to each other in well known, conventional manners. Receptacle 12 is composed of a cone-shaped bottom portion 16 and a generally cylindrically shaped body portion 18 having an open top 20. Receptacle 16 is constructed from a plurality of flat, thin, elongate staves 22 which are disposed in spaced apart relationship relative to each other around the circumference of bottom portion 16 and body portion 18. Staves 22 extend upwardly and flair outwardly from a collar 24 used to attach the lower ends of the staves to the upper end of pole 14. Cylindrically-shaped body portion 18 is formed by bending staves 22 so that they extend vertically upwardly from a lower hoop 26, which surrounds the staves, and supports them in spaced parallel relationship to each other to form container 12 in a generally open construction. An intermediate hoop 28 and an upper hoop 30 also surround staves 22. Hoops 26, 28, and 30 are fixedly secured to each stave 22 by any convenient means, for instance by utilizing rivets 32, to thereby form receptacle 12 in a rigid, but lightweight construction. Staves 22 and hoops 26, 28 and 30 may be formed from light gauge metal, durable plastic or other suitable material.

A plurality of flat, elongate fingers 34, which are spaced apart along the circumference of upper hoop 32, extend upwardly from the upper hoop to terminate at upwardly pointed tips 36. Although not essential, but for simplicity of construction, ideally fingers 34 constitute extensions of staves 22. Also, rather than being pointed, tips 36 may instead be rounded.

As best shown in FIGS. 1, 3 and 4, each of the fingers 34 includes an enlarged base portion 38 composed in part of upper shoulders 40 which slope laterally outwardly and downwardly from the sides 41 of fingers 34. Ideally, the two shoulders 40 of each finger 34 are symmetrical and intersect the adjacent shoulders 40 of adjacent fingers at locations slightly above the upper edge of upper hoop 30. Enlarged portions 38 also include lower shoulders 42 which extend downwardly and diagonally inwardly from shoulders 40 to intersect with the upper portions of staves 22 at an elevation slightly below the lower edge of upper hoop 30 to form, together with upper shoulders 40, enlarged portions 38 in a generally diamond shape.

As best shown in FIG. 4, in cross section the edges of upper shoulders 40 are beveled to form sharp cutting edges 44. The edges 44 of a pair of intersecting shoulders 40 of adjacent fingers 34 in profile define a generally V-shape.

Rather than forming fingers 34 with two opposing shoulders 40, each finger can be formed with a single shoulder which intersects the vertical side edge of an adjacent finger. Correspondingly each finger would have one cutting edge in place of the two cutting edges 44.

To use fruit picker 10, the lower end of pole 14 is grasped by the user standing on the ground so that receptacle 12 is held up in the air. The receptacle is positioned so that the stem of the fruit is placed between adjacent fingers 34 with the fruit disposed above receptacle opening 20. Picker 10 is then simply pushed upwardly so that the stem is forced against finger cutting edges 44 which cleanly cut the stem thereby allowing the fruit to drop into receptacle 16. This operation is continued until receptacle 12 is full and then picker 10 is simply lowered so that the fruit can be emptied from the receptacle. It will be appreciated that once the fruit stem is disposed between fingers 34, the V-shaped cutting blade formed by adjacent edges 44 holds the stem captive so that the stem is conveniently severed even if receptacle 12 is not held perfectly level. Also, constructing the present invention in the manner described above results in a fruit picker which is of light enough weight so that it can be accurately and easily manipulated without tiring the user.

Figure 5:
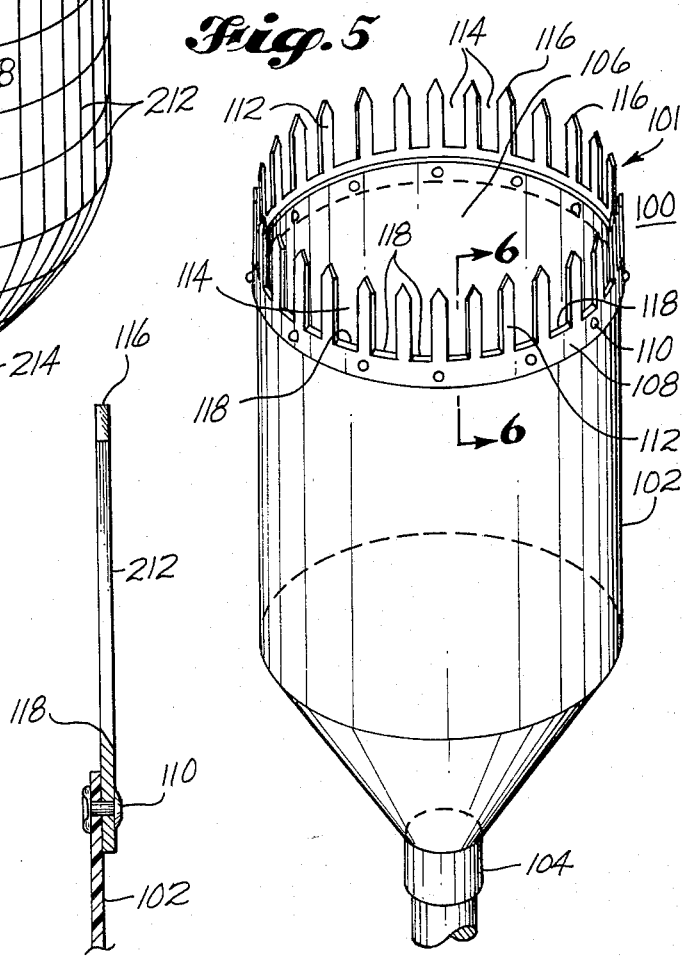
FIG. 5 is an isometric view of a second typical embodiment of the present invention.
Figure 6:
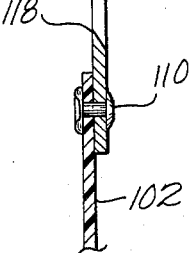
FIG. 6 is an enlarged, partial cross-sectional view of the embodiment of the present invention illustrated in FIG. 5 and taken substantially along lines 6—6 thereof.

Another typical embodiment of the present invention is illustrated in FIGS. 5 and 6 wherein a fruit picker 100 is constructed with an attachment 101 mounted on the upper edge portion of a receptacle 102 which is affixed to the upper end of an elongate pole or handle 104. Receptacle 102 is illustrated as being generally cylindrical in shape and having a top opening 106. Receptacle 102 can be constructed in the manner of receptacle 12 illustrated in FIGS. 1 or 2 or may be of solid construction or of other types of construction as long as it has sufficient structural integrity to support attachment 101 and the picked fruit disposed within the receptacle. Also, for ease of construction and use, ideally receptacle 102 is of cylindrical shape; However, it may be formed in other shapes, such as square, hexagonal or octagonal and still provide the advantages of the present invention.

Attachment 101 includes a flat rim member 108 which encircles the upper edge portion of receptacle 102 and is securely attached thereto by any convenient means, such as with a plurality of rivets 110 extending through the rim member and the upper edge of the receptacle. A plurality of spaced apart, flat, elongate fingers 122 extend upwardly from the upper edge portion of rim 108 in spaced parallel relationship to each other to define rectangularly shaped openings 114 between adjacent fingers. The upper end portion of each finger 112 tapers to a tip 116. The upper edge portion of the sections of rim 108 which extend between adjacent fingers 112 is beveled in the upwardly direction to form sharp cutting edges 118. Ideally, for economy of construction, rim member 108 and fingers 112 are integrally formed as a single unit. Preferably attachment 101 is formed from metal, plastic or other suitable material which is capable of carrying the forces imposed on fingers 112 when pushed against branches and which is capable of maintaining edges 118 in sharp condition even after prolonged use of picker 100.

Rather than constructing attachment 101 with transverse cutting edges 118, fingers 112 can be formed with sloped shoulders and corresponding cutting edges similar to shoulders 40 and cutting edges 44 of fingers 34 illustrated in FIGS. 1 and 3.

To use picker 100, the user, who is standing on the ground, conveniently holds the lower end of pole 104 to guide the picker so that the stem of a fruit is received within one of the openings 114 extending between adjacent fingers 112 with the fruit itself disposed above receptacle opening 106. The pointed tip 16 of fingers 112 serve as a lead-in for guiding the fruit stem into an opening 114. Thereafter, the fruit picker is simply pushed upwardly so that blade edge 118 cleanly cuts the fruit stem and the fruit drops into the interior of receptacle 102.

Figure 7:
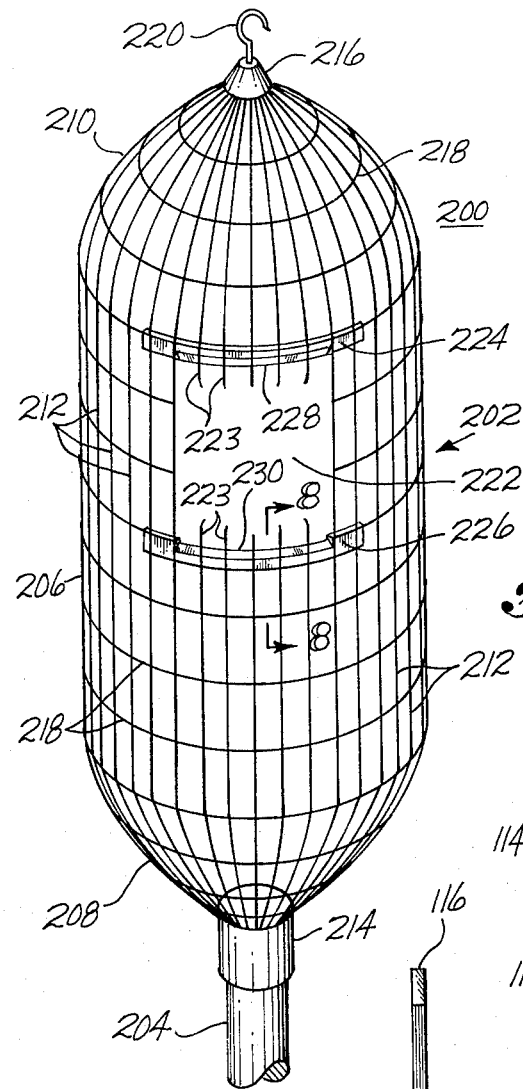
FIG. 7 is an isometric view of a further embodiment of the present invention.

A further typical embodiment of the present invention is illustrated in FIGS. 7 and 8 wherein a fruit picker 200 is composed of a receptacle 202 attached to the upper end of an elongate handle or pole 204. Receptacle 202 is constructed generally in the shape of an upright, elongate, closed capsule consisting of a cylindrical body portion 206, a dome-shaped bottom portion 208 and a dome-shaped top portion 210. Preferably receptacle 202 is constructed from wire material with elongate strands 212 extending upwardly from a collar 214 affixed to the upper end of pole 204 through the entire length of the receptacle to terminate at a cone-shaped cap 216 disposed at the top of the receptacle. A series of circular, vertical spaced apart hoops 218 encircle strands 212 to cooperate therewith to form the shape of the receptacle. Hoops 218 may be attached to strands 212 by any convenient means, such as with weldments. A downwardly open hook 220 extends upwardly from the truncated top of cap 216. Although for simplicity of construction and ease of operation, ideally receptacle 202 is formed in the capsule shape illustrated in FIG. 5, the receptacle can be formed in other shapes, such as spherical, square or rectangular. Also, rather than being constructed from lengths of wire material, receptacle 202 may be formed from other structural materials as staves similar to those used to consrtuct receptacle 12 illustrated in FIGS. 1 and 2.

A rectangularly shaped opening 222 is formed in the upper part of receptacle body portion 206. Ideally, opening 222 is formed by cutting away strands 212 and hoops 218 in this area. A plurality of elongate fingers 223 extend upwardly from the lower margin of opening 222 and downwardly from the upper margin of the opening. As best shown in FIG. 6, preferably the free end portions of fingers 223 are curved inwardly toward the interior of receptacle 202.

Fruit picker 200 also includes a pair of arcuate upper and lower blades 224 and 226 which are attached to the inside surface of receptacle 202 at the upper and lower margins of openings 222. The curvature of blades 224 and 226 correspond to the curvature of receptacle body portion 206. Blades 224 and 226 may be attached to strands 212 and hoops 218 by any convenient means, such as by weldments. As most clearly shown in FIG. 8, the edges of the portions of blades 224 and 226 disposed toward opening 222 and within the width of opening 222 are beveled in the direction toward the opening to thereby define sharp cutting edges 228 and 230, respectively. As illustrated in FIG. 5, fingers 223 extend beyond the location of blades 224 and 226.

Picker 200 is used to pick fruit by manually grasping the lower end of pole 204 and manipulating receptacle 202 so that the fruit is placed within opening 222. Thereafter picker 200 is either pushed upwardly or pulled downwardly so that the stem of the fruit is cleanly cut by lower blade 226 or upper blade 224, respectively, to cause the fruit to drop into the receptacle. The fingers 223 restrain the fruit stem from sliding along blades 224 or 226, for instance if the blades are not disposed in precise horizontal orientation when the picker is pushed up or pulled down. Once the receptacle is filled, picker 200 can be simply lowered to the ground so that the receptacle can be emptied through opening 222. It is to be appreciated that because of the substantially closed construction of receptacle 202, there is little chance that fruit contained therein will spill out while the picker is being lowered.

Although not illustrated, picker 200 shown in FIG. 7 can be modified by forming the receptacle in a generally cylindrical shape within an open top similar to the shape of receptacle 102 illustrated in FIG. 5. In addition, lower blade 226 can be lengthened to extend the entire distance around the upper portion of this modified version of the receptacle. This alternative fruit picker design also includes the advantages provided by picker 10 illustrated in FIGS. 1 and 2 and picker 100 illustrated in FIG. 5.

As will be apparent to those skilled in the art to which the invention is addressed, the present invention may be embodied in forms and in embodiments other than those specifically disclosed above without departing from the spirit or essential characteristics of the invention. The particular embodiments of the fruit pickers 10, 100 and 200 described above are therefore to be considered in all respects as illustrative and not restrictive, the scope of the invention is set forth in the appended claims rather than being limited to the examples of the fruit pickers 10, 100 and 200 set forth in the foregoing description.

What is claimed is:

1. An apparatus for picking fruit from a tree while standing on the ground, comprising:
    (a) a plurality of individual, thin, rigid, elongate members spaced apart from each other to form a fruit receiving receptacle, said members each including:
        a substantially straight main portion to cooperatively form a tubular body section of said receptacle having an opening formed therein; and
        a lower portion angularly disposed relative to its corresponding main portion to cooperatively form a bottom section of said receptacle;
    (b) means for securing said members in spaced apart, fixed relationship to each other to cooperatively form the body and bottom sections of said receptacle;
    (c) elongate pole means secured to the center of said receptacle bottom section;
    (d) a plurality of substantially straight, elongate, spaced apart fingers projecting from said receptacle along the receptacle opening, each of said fingers:
        associated with an individual receptacle member and forming a coplanar extension of said associated receptacle member; and
        including a base portion at the intersection with said associated receptacle member, an elongate medial portion, and a pointed tip at the end of said finger opposite said base portion, said base portion having edges oriented angularly to said medial portion and intesecting an edge of an adjacent base portion;
    (e) stationary, sharp blade means extending along the edges of said base portions of adjacent fingers; and
    (f) wherein said apparatus is positionable to receive a stem of the fruit between adjacent fingers and then the stem is severed either by shifting the elongate handle longitudinally to cut the stem with said blade means or by rotating the elongate handle to twist and/or cut the stem with said fingers.

2. The fruit picking apparatus according to claim 1, wherein:
    said receptacle has an open top;
    each of said receptacle members and its integral, associated finger comprising a single, substantially straight, flat stave member extending upwardly along the height of said receptacle;
    said fingers being disposed around the entire receptacle opening and extending upwardly at the top of said receptacle to define said open top;
    the medial portion of each of said fingers being elongate and having parallel side edges;
    the base portion of each of said fingers including a shoulder extending diagonally downwardly and outwardly from each side of said finger medial portion toward the base portion of an adjacent receptacle member; and
    the edge portions of each of said diagonal shoulders being sharpened to comprise such stationary blade means.

3. The fruit picking apparatus according to claim 1, wherein:
    said receptacle includes a substantially closed top section;
    wherein said opening is formed in the body section of said receptacle, said opening including upper and lower margins; and
    said blade means comprising an elongate blade member extending along substantially the entire length of the upper and lower margins of said receptacle opening at an orientation transversely to the lengths of said fingers, said elongate blade members having a curvature generally corresponding to the curvature of said receptacle.

4. The fruit picking apparatus according to claim 1, wherein:
    said receptacle has an open top;
    said fingers extend upwardly from the margin of said open top, each of said finger side edges being parallel to each other and parallel to the side edge of an adjacent finger; and
    said blade means comprising individual blade sections extending along the margin of said top to intersect adjacent fingers, said blade means having an upper cutting edge extending transversely to the length of said fingers.

* * * * *